United States Patent
Hou

(10) Patent No.: US 11,984,643 B2
(45) Date of Patent: May 14, 2024

(54) ELECTRONIC DEVICE

(71) Applicant: BEIJING XIAOMI MOBILE SOFTWARE CO., LTD., Beijing (CN)

(72) Inventor: Xiaolin Hou, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 353 days.

(21) Appl. No.: 17/443,568

(22) Filed: Jul. 27, 2021

(65) Prior Publication Data
US 2022/0311126 A1    Sep. 29, 2022

(30) Foreign Application Priority Data

Mar. 23, 2021 (CN) .......................... 202110309966.3

(51) Int. Cl.
*H01Q 1/24* (2006.01)
*H01Q 5/335* (2015.01)
*H01Q 13/16* (2006.01)
*H04M 1/02* (2006.01)

(52) U.S. Cl.
CPC ............. *H01Q 1/243* (2013.01); *H01Q 5/335* (2015.01); *H01Q 13/16* (2013.01); *H04M 1/0216* (2013.01); *H04M 1/0268* (2013.01)

(58) Field of Classification Search
CPC ........ H01Q 1/243; H01Q 5/335; H01Q 13/16; H01Q 1/2266; H01Q 5/35; H01Q 21/28; H01Q 1/242; H01Q 1/36; H01Q 13/106; H01Q 1/24; H01Q 1/46; H04M 1/0216; H04M 1/0268; H04M 1/026; H03H 7/383
See application file for complete search history.

(56) References Cited

U.S. PATENT DOCUMENTS

| | | | |
|---|---|---|---|
| 11,056,768 B2 * | 7/2021 | Kim | ........................ H01Q 21/00 |
| 2020/0411957 A1 | 12/2020 | Zhu et al. | |
| 2021/0318720 A1 * | 10/2021 | Lin | ........................... H01Q 1/36 |
| 2022/0115768 A1 * | 4/2022 | Oh | ............................ H01Q 9/42 |

FOREIGN PATENT DOCUMENTS

| | | |
|---|---|---|
| CN | 109728412 A | 5/2019 |
| KR | 20200100986 A | 8/2020 |

OTHER PUBLICATIONS

European Patent Application No. 21188109.9, Search and Opinion dated Jan. 26, 2022, 8 pages.

* cited by examiner

*Primary Examiner* — Hai V Tran
*Assistant Examiner* — Michael M Bouizza
(74) *Attorney, Agent, or Firm* — COZEN O'CONNOR

(57) ABSTRACT

Provided is an electronic device. The electronic device includes a base and a flip. The flip is rotatable around a rotation axis to bring the electronic device into a closed state. The base is provided with a first antenna including a first slot, and the flip is provided with a second antenna including a groove. In the closed state, the first slot in the first antenna is opposite to the groove in the second antenna.

18 Claims, 2 Drawing Sheets

ELECTRONIC DEVICE

CROSS-REFERENCE TO RELATED APPLICATIONS

This application claims a priority to Chinese Patent Application No. 202110309966.3, filed on Mar. 23, 2021, the entire content of which is incorporated herein by reference for all purposes.

TECHNICAL FIELD

The present disclosure generally relates to antennas in electronic devices, and more particularly, to an electronic devices with folding screens that are provided with multiple antennas.

BACKGROUND

As smartphones become larger and larger, a foldable screen has been incorporated in smartphones and other electronic devices. A folding screen may not only meet the needs of large-screen display to provide users with better video watching and game playing experiences, but also reduces the size of the smartphone, so it is more convenient to carry.

At present, an increasing variety of antenna frequency bands are being used, and the frequency bands that need to be supported by smartphones increase accordingly. As the size of the smartphones becomes smaller and smaller, the space for individual antennas correspondingly becomes smaller and smaller. Therefore, it is a serious challenge for antenna engineers how to arrange more antennas within the limited space of the smartphone or other electronic devices with foldable screens.

SUMMARY

An electronic device is provided in the present disclosure to solve at least one of the problems existing in the related art.

According to a first aspect of embodiments of the present disclosure, there is provided an electronic device. The electronic device may be used in an expanded state and a closed state and includes a base and a flip. The flip is rotatable around a rotation axis to bring the electronic device between the expanded state and the closed state. The base is provided with a first antenna including a first slot, and the flip is provided with a second antenna including a groove. In the closed state, the first slot in the first antenna is opposite to the groove in the second antenna.

It is to be understood that both the foregoing general description and the following detailed description are exemplary and explanatory only and are not restrictive of the present disclosure, as claimed.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Figure 1:
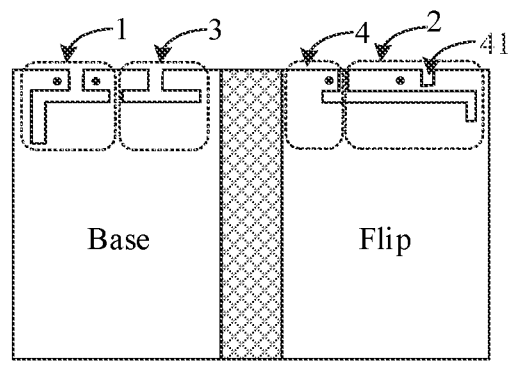
FIG. 1 is a schematic diagram illustrating an expanded state of an electronic device according to an embodiment of the present disclosure.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses consistent with aspects related to the present disclosure as recited in the appended claims.

According to a first aspect of embodiments of the present disclosure, there is provided an electronic device. The electronic device may be used in an expanded state and a closed state and includes a base and a flip. The flip is rotatable around a rotation axis to bring the electronic device between the expanded state and the closed state. The base is provided with a first antenna including a first slot, and the flip is provided with a second antenna including a groove. In the closed state, the first slot in the first antenna is opposite to the groove in the second antenna.

Optionally, the base is further provided with a third antenna, and the flip is further provided with a fourth antenna. In the closed state, the third antenna is opposite to the fourth antenna.

Optionally, the base includes a main housing, a first L-shaped radiating section, a T-shaped radiating section, a second L-shaped radiating section, a first feeding point and a second feeding point. The first L-shaped radiating section, the T-shaped radiating section and the second L-shaped radiating section are respectively connected to the main housing.

The first feeding point is disposed at a first end of the first L-shaped radiating section, and the second feeding point is disposed at a first end of a lateral radiating section of the T-shaped radiating section. The first end of the first L-shaped radiating section provided with the first feeding point is opposite to the first end of the lateral radiating section provided with the second feeding point.

The first L-shaped radiating section, the T-shaped radiating section and the main housing together define a first L-shaped slot. The first L-shaped radiating section, the main housing, the T-shaped radiating section, the first feeding point, and the second feeding point form the first antenna.

Optionally, the base further includes the second L-shaped radiating section connected to the main housing. The second L-shaped radiating section is opposite to a second end of the lateral radiating section away from the second feeding point. The second L-shaped radiating section, the T-shaped radiating section and the main housing together define a strip-shaped slot, and the second L-shaped radiating section, the T-shaped radiating section and the main housing form a third antenna.

Optionally, the flip includes a secondary housing, a third L-shaped radiating section, a fourth L-shaped radiating section, a third feeding point and a fourth feeding point. The third L-shaped radiating section and the fourth L-shaped radiating section are respectively connected to the secondary housing. The fourth L-shaped radiating section has the groove.

The third feeding point is disposed on the third L-shaped radiating section, and the fourth feeding point is disposed on the fourth L-shaped radiating section. The third L-shaped radiating section and the fourth L-shaped radiating section are opposite to define a second slot, and the fourth feeding point is arranged between the second slot and the groove.

The third L-shaped radiating section, the fourth L-shaped radiating section and the secondary housing together define a second L-shaped slot. A lateral part of the second L-shaped slot is far away from the third L-shaped radiating section. The third L-shaped radiating section, the third feeding point and the secondary housing form a fourth antenna, and the fourth L-shaped radiating section, the fourth feeding point and the secondary housing form the second antenna.

Optionally, the first antenna is a GPS & WiFi antenna having a working frequency band of L1/L5/WiFi 2.4G/WiFi 5G.

The second antenna is a low-frequency antenna having a working frequency band of B5/B8/B20/B28.

The third antenna is a high-frequency antenna having a working frequency band of N78/79 or LTE B1/B3/B7.

The fourth antenna is a medium-high-frequency antenna having a working frequency band of B32/N41.

Optionally, a width of the groove is equal to a width of the first slot in the first antenna, and a depth of the groove is smaller than a depth of the first slot in the first antenna. A width direction of the groove is parallel to an extension direction of a frame where the first antenna and the second antenna are located, and a depth direction of the groove is perpendicular to the extension direction of the frame where the first antenna and the second antenna are located.

Optionally, the fourth antenna includes a first matching circuit configured to eliminate a current signal coupled from the first antenna and/or the third antenna in the closed state, and an input end of the first matching circuit is connected to a body of the fourth antenna and an output end of the first matching circuit is grounded.

Optionally, the first matching circuit includes an LC filter circuit.

Optionally, the LC filter circuit includes an inductor having an inductance of 24 to 30 nH and a capacitor having a capacitance of 0.2 to 0.3 PF.

Optionally, the second antenna includes a second matching circuit configured to eliminate a current signal coupled from the first antenna and/or the third antenna in the closed state, and an input end of the second matching circuit is connected to a body of the second antenna and an output end of the second matching circuit is grounded.

Optionally, the second matching circuit includes a switch, a plurality of matching branches and a ground terminal. An input end of the switch is connected to the body of the second antenna, and each output end of the switch is connected to a first end of each of the plurality of the matching branches. A second end of each of the plurality of the matching branches is connected to the ground terminal.

Optionally, the plurality of the matching branches include a capacitor branch having a preset capacitor with a capacitance greater than a preset capacitance.

Optionally, the switch has a fully open state where all of the plurality of the matching branches are connected to the body of the second antenna, and an equivalent capacitance of the plurality of the matching branches is greater than the preset capacitance.

Embodiments of the present disclosure have the advantages as follows.

As described above, the electronic device provided in embodiments of the present disclosure includes the base and the flip. The flip is rotatable around the rotation axis to bring the electronic device into a closed state. The base is provided with the first antenna, and the first antenna includes the first slot; and the flip is provided with the second antenna, and the second antenna includes the groove. In the closed state, the first slot in the first antenna is opposite to the groove in the second antenna. In this way, the groove provided in the second antenna can match the first slot when the base and the flip are closed, so as to improve the radiation performance of the first antenna, without affecting the length of the second antenna. In addition, according to embodiments of the present disclosure, the number of antennas in the electronic device may be increased so as to meet the demands of the electronic device to function with multiple antenna frequency bands, and the antennas are disposed in the base and the flip, which may reduce the number of the antennas in a single side, so as to provide enough space for each antenna.

In the following, the electronic device according to embodiments of the present disclosure will be described in detail with reference to accompanying drawings.

Figure 2:
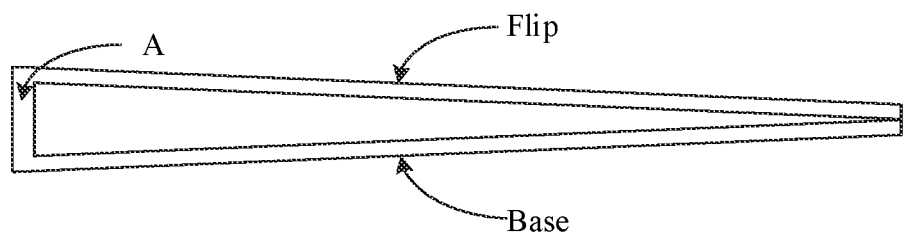
FIG. 2 is a schematic diagram illustrating a closed state of an electronic device according to an embodiment of the present disclosure.

In order to solve the above-mentioned problems, embodiments of the present disclosure provide an electronic device, such as a smart phone or a tablet computer with a foldable screen. The electronic device includes a base and a flip, and the flip is rotatable around a rotation axis A to bring the electronic device into an expanded state or a closed state. FIG. 1 is a schematic top view of an electronic device in an expanded state according to an embodiment of the present disclosure. FIG. 2 is a schematic side view of an electronic device in a closed state according to an embodiment of the present disclosure. As shown in FIG. 1 and FIG. 2, the electronic device includes the base and the flip, the flip is rotatable around a rotation axis A to bring the electronic device into the closed state. The base is provided with a first antenna 1, and the first antenna 1 includes a first slot. The flip is provided with a second antenna 2, and the second antenna 2 includes a groove 41. In the closed state, the first slot in the first antenna 1 is opposite to the groove in the second antenna 2. According to embodiments of the present disclosure, the groove is provided in the second antenna, which at the first aspect does not affect the length of the second antenna, and in the second aspect can match the first slot when the base and the flip are closed, so as to improve the radiation performance of the first antenna.

It should be noted that the base and the flip each may be provided with at least one antenna, if allowable. For the convenience of explanation, embodiments where the base and the flip each are provided with two antennas are described as an example. As shown in FIG. 1 and FIG. 2, the base is further provided with a third antenna 3, and the flip is provided with a fourth antenna 4. In the closed state, the third antenna 3 is opposite to the fourth antenna 4.

In some embodiments of the present disclosure, the first antenna 1 may be a GPS & WiFi antenna, in which the GPS antenna has an L1/L5 working frequency band, and the WiFi antenna has a working frequency band of WiFi2.4G (Hz) or WiFi 5G (Hz). The third antenna 3 may be a high-frequency antenna having a working frequency band of N78/79 or LTE B1/B3/B7. The fourth antenna 4 is a medium-high-frequency antenna having a working frequency band of B32/N41. The second antenna 2 is a low-frequency antenna having a working frequency band of B5/B8/B20/B28. It should be noted that the above-mentioned working frequency bands of the first antenna 1, the second antenna 2, the third antenna 3 and the fourth antenna 4 are presented as an example for illustration, and may be suitably determined by the person skilled in the art as required. In this way, according to embodiments of the present disclosure, the number of the antennas in the electronic device may be increased so as to meet the demands of the electronic device to function with multiple antenna frequency bands, and the antennas are disposed in the base and the flip, such that the number of the antennas in a single side may be reduced, so as to provide enough space for each antenna, which is advantageous in the improvement of working efficiency of each antenna.

Figure 3:
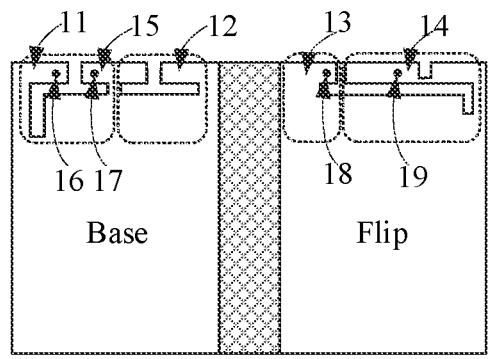
FIG. 3 is a schematic diagram illustrating an expanded state of an electronic device according to another embodiment of the present disclosure.

As shown in FIG. 3, in an embodiment, the base includes a main housing, a first L-shaped radiating section 11, a T-shaped radiating section 15, a second L-shaped radiating section 12, a first feeding point 16 and a second feeding point 17. The first L-shaped radiating section 11, the T-shaped radiating section 15 and the second L-shaped radiating section 12 each are connected to the main housing.

The first feeding point 16 is disposed at a first end of the first L-shaped radiating section 11, and the second feeding point 17 is disposed at a first end of a lateral radiating section of the T-shaped radiating section 15. The first end of the first L-shaped radiating section 11 provided with the first feeding point 16 is opposite to the first end of the lateral radiating section provided with the second feeding point 17. In this way, the first L-shaped radiating section 11, the T-shaped radiating section 15 and the main housing together define a first L-shaped slot. The first L-shaped radiating section 11, the main housing, the T-shaped radiating section 15, the first feeding point 16, and the second feeding point 17 form the first antenna 1. The second L-shaped radiating section 12 is opposite to a second end of the lateral radiating section away from the second feeding point 17. The second L-shaped radiating section 12, the T-shaped radiating section 15 and the main housing together define a strip-shaped slot, and the second L-shaped radiating section 12, the T-shaped radiating section 15 and the main housing form the third antenna 3.

As shown in FIG. 3, in an embodiment, the flip includes a secondary housing, a third L-shaped radiating section 13, a fourth L-shaped radiating section 14, a third feeding point 18 and a fourth feeding point 19. The third L-shaped radiating section 13 and the fourth L-shaped radiating section 14 each are connected to the secondary housing. The fourth L-shaped radiating section 14 includes groove 41.

The third feeding point 18 is disposed on the third L-shaped radiating section 13, and the fourth feeding point 19 is disposed on the fourth L-shaped radiating section 14. The third L-shaped radiating section 13 and the fourth L-shaped radiating section 14 are opposite to define a second slot, and the fourth feeding point 19 is arranged between the second slot and the groove. In this way, the third L-shaped radiating section 13, the fourth L-shaped radiating section 14 and the secondary housing together define a second L-shaped slot. A lateral part (arranged in a vertical direction as shown in the FIG. 3) of the second L-shaped slot is far away from the third L-shaped radiating section 13. The third L-shaped radiating section 13, the third feeding point 18 and the secondary housing form the fourth antenna 4, and the fourth L-shaped radiating section 14, the fourth feeding point 19 and the secondary housing form the second antenna 2.

As shown in FIG. 1 to FIG. 3, in some embodiments, the second antenna 2 in the flip includes the groove 41. A width of the groove 41 is equal to a width of the first slot in the first antenna 1, and a depth of the groove 41 is smaller than a depth of the first slot in the first antenna 1. A width direction of the groove 41 is parallel to an extension direction of a frame where the first antenna 1 and the second antenna 2 are located, and a depth direction of the groove 41 is perpendicular to the extension direction of the frame where the first antenna 1 and the second antenna 2 are located. The extension direction corresponds to the upper edge of the expanded electronic device as shown in FIG. 3. The depth direction is perpendicular to the extension direction. In the closed state, the groove is opposite to the first slot, and in the expanded state, the groove is symmetrical to the first slot about the rotation axis. In this way, providing the groove 41 in the second antenna 2 according to embodiments of the present disclosure may increase the length of the second antenna 2 to ensure transmission efficiency, as compared with directly providing a slot at the second antenna. In other word, by providing the groove 41 in the second antenna 2 according to embodiments of the present disclosure, the transmission efficiency of the first antenna 1 and the second antenna 2 may be improved without reducing the length of the second antenna 2. In addition, in the closed state of the electronic device, the groove is opposite to the first slot, which is equivalent to providing a small slot in the device, and ensures the aesthetics of the electronic device at the same time.

In practical application, the first antenna 1 may be a dual-frequency GPS & WiFi antenna adopting a single-slot dual-fed solution. When the electronic device is in the closed state (i.e., folded state), coupling cavities may be formed between the first antenna 1 and the second antenna 2, the third antenna 3 and the fourth antenna 4, and the first antenna 1 and the fourth antenna 4, such that a coupling current is generated on the metal bodies of the fourth antenna 4 and the second antenna 2, which reduces the working efficiency of the first antenna 1 and/or the third antenna 3.

For this, according to some embodiments of the present disclosure, the fourth antenna 4 includes a first matching circuit. An input end of the first matching circuit is connected to a body of the fourth antenna 4 and an output end of the first matching circuit is grounded. In this way, when the electronic device is in the closed state, the first matching circuit may eliminate a current signal coupled from the first antenna 1 or the third antenna 3, or the first antenna 1 and the third antenna 3. That is, the first matching circuit may lead a higher frequency current signal coupled from the first antenna 1 or the third antenna 3 into the ground, so as to prevent the coupled current signal from forming a radiating field to offset a radiating field formed by the first antenna 1 or the third antenna 3, thereby ensuring normal operations of the first antenna 1 and the third antenna 3.

Figure 4:
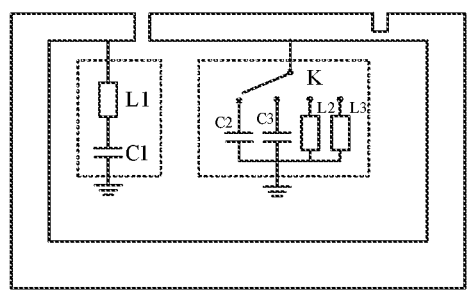
FIG. 4 is a schematic diagram illustrating matching circuits disposed in the flip according to an embodiment of the present disclosure.

As shown in FIG. 4, in some embodiments of the present disclosure, the first matching circuit may include an LC filter circuit. The LC filter circuit includes an inductor L1 and a capacitor C1, and has a working frequency of 1.58 GHz to 1.7 GHz, the inductor L1 has an inductance of 24 nH to 30 nH, and the capacitor C1 has a capacitance of 0.2 PF to 0.3 PF, such that the current signal (such as in the L1 frequency band) coupled from the first antenna 1 and the third antenna 3 can be screened out. In practical applications, the larger the inductance of the inductor in the LC filter circuit, the smaller the impact on the fourth antenna, so in an embodiment of the present disclosure, the inductance of the inductor may be 30 nH.

Given that the groove 41 in the second antenna 2 will affect the working performance of the first antenna 1 and/or the third antenna 3, in some embodiments of the present disclosure, the second antenna 2 includes a second matching circuit. An input end of the second matching circuit is connected to a body of the second antenna, and an output end of the second matching circuit is grounded. In this way, when the electronic device is in the closed state, the second matching circuit may eliminate a current signal coupled from the first antenna 1 and/or the third antenna 3. This is, the second matching circuit may lead a higher frequency current signal coupled from the first antenna 1 or the third antenna 3 into the ground, so as to enable the first antenna 1 and the third antenna 3 to normally operate and improve the working efficiency of the first antenna 1 and the third antenna 3.

As shown in FIG. 4, in some embodiments of the present disclosure, the second matching circuit may include a switch K, a plurality of matching branches (such as 2 capacitor branches and 2 inductor branches shown in FIG. 4, which may be adjusted as required) and a ground terminal. Among them, an input end of the switch is connected to the body of the second antenna, each output end of the switch is connected to a first end of each of the plurality of the matching branches, and a second end of each of the plurality of the matching branches is connected to the ground terminal. In this way, the electronic device may be switched to a specific matching branch by controlling the switch, and the second antenna may access a corresponding matching impedance, thereby adjusting its working frequency band.

Among them, the switch may include, but is not limited to, a single-pole multi-throw switch, a relay, and a transistor; and may also be a switch circuit with multiple outputs, which is not particularly limited herein and can be determined by those skilled in the art as required. In an embodiment of the present disclosure, the switch is an SP4T switch.

Among them, the plurality of the matching branches may include, but are not limited to, a resistor branch, an inductor branch, a capacitor branch, and an impedance circuit formed by at least two of a resistor, an inductor, and a capacitor. The plurality of the matching branches may have different capacitance in the range of such as 0.3 pF to 2 pF.

According to embodiments of the present disclosure, the plurality of the matching branches may reserve a matching branch for optimizing the first antenna 1 and the third antenna 3, and the remaining matching branches may be configured to adjust the working frequency band of the second antenna 2. Given that the second antenna 2 is a low-frequency antenna, and the first antenna 1 and the third antenna 3 are high-frequency antennas, the reversed matching branch may be a capacitor branch having a preset capacitor with a capacitance greater than a preset capacitance (such as 1.5 pF). In other words, under the condition that the normal operation of the second antenna is not affected, the capacitance of the preset capacitor may be as larger as possible to filter out the current signal coupled from the first antenna and the third antenna.

For example, as shown in FIG. 4, the second matching circuit includes 4 matching branches, among them, 3 matching branches may be configured to adjust the working frequency band of the second antenna, and the other one may be configured to optimize the first antenna 1 and the third antenna 3. Of course, a fully open state may be set, under which 4 matching branches may access simultaneously, in this case, an equivalent capacitance of the 4 matching branches is largest, and the working efficiency of the first antenna 1 and the third antenna 3 is correspondingly the highest. Any combination of matching branches which is able to adjust the working frequency band of the second antenna and optimize the antennas in the base falls within the protection scope of the present disclosure.

Figure 5:
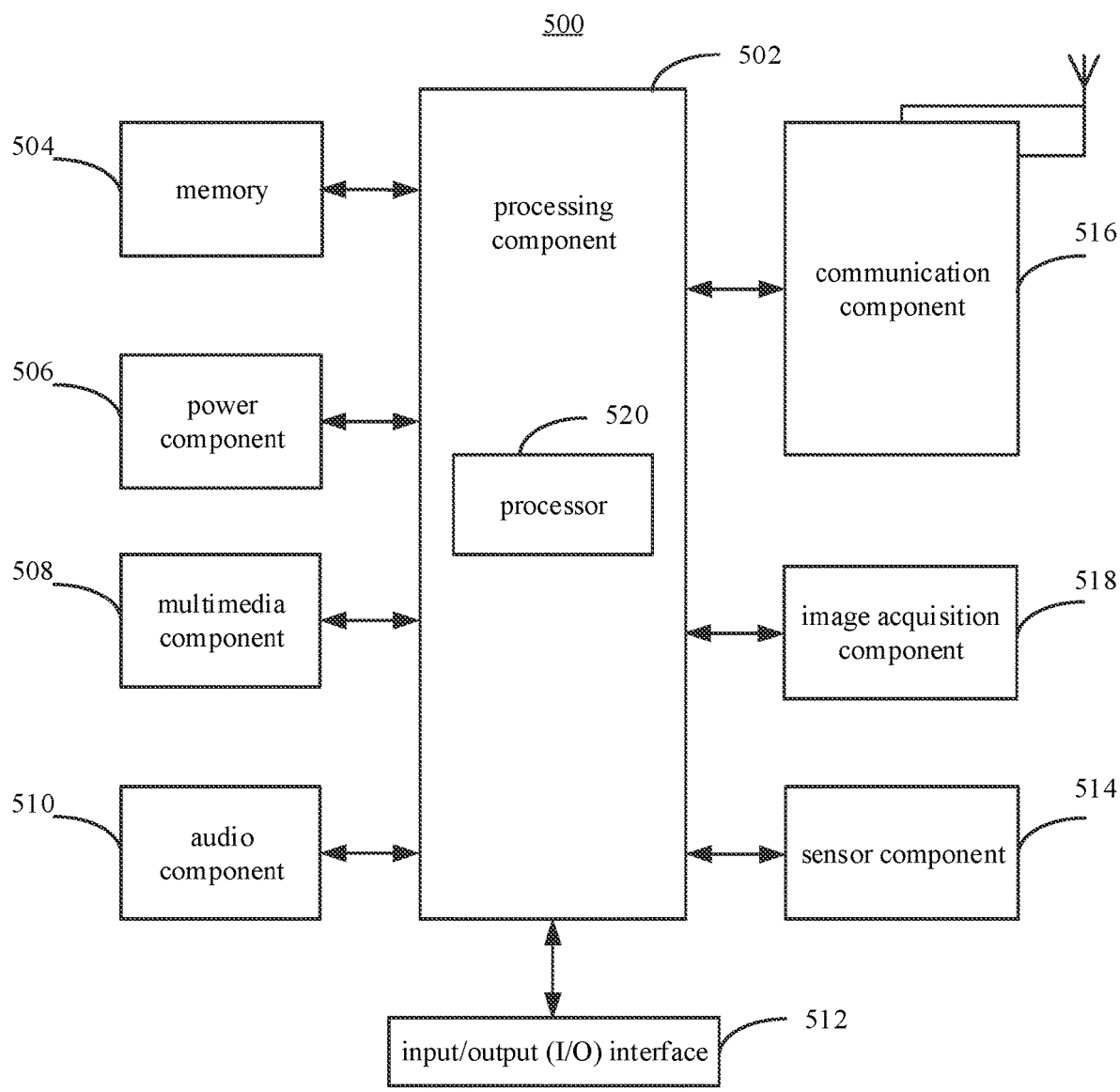
FIG. 5 is a block diagram of an electronic device according to an embodiment of the present disclosure.

FIG. 5 is a block diagram of an electronic device according to an embodiment of the present disclosure. For example, the electronic device 500 may be a mobile phone, a computer, a digital broadcast terminal, a tablet, a medical device, exercise equipment, a personal digital assistant, and the like.

As shown in FIG. 5, the electronic device 500 may include one or more of the following components: a processing component 502, a memory 504, a power component 506, a multimedia component 508, an audio component 510, an input/output (I/O) interface 512, a sensor component 514, a communication component 516 and an image acquisition component 518.

The processing component 502 typically controls overall operations of the electronic device 500, such as the operations associated with display, telephone calls, data communications, camera operations, and recording operations. The processing component 502 may include one or more processors 520 to execute computer program. Moreover, the processing component 502 may include one or more modules which facilitate the interaction between the processing component 502 and other components. For instance, the processing component 502 may include a multimedia module to facilitate the interaction between the multimedia component 508 and the processing component 502.

The memory 504 is configured to store various types of data to support the operation of the electronic device 500. Examples of such data include instructions for any applications or methods operated on the electronic device 500, contact data, phonebook data, messages, pictures, video, etc. The memory 504 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 506 provides power to various components of the electronic device 500. The power component 506 may include a power management system, one or more power sources, and any other components associated with the generation, management, and distribution of power in the electronic device 500. The power component 506 may include a power chip, and the controller may communicate with the power chip to control the power chip to turn on or off the switching device, so that the battery supplies power to the main board circuit or not.

The multimedia component 508 includes a screen providing an output interface between the electronic device 500 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action.

The audio component 510 is configured to output and/or input audio signals. For example, the audio component 510 includes a microphone ("MIC") configured to receive an external audio signal when the electronic device 500 is in an operation mode, such as a call mode, a recording mode, and a voice recognition mode. The received audio signal may be further stored in the memory 504 or transmitted via the communication component 516. In some embodiments, the audio component 510 further includes a speaker to output audio signals.

The I/O interface 512 provides an interface between the processing component 502 and peripheral interface modules, such as a keyboard, a click wheel, buttons, and the like.

The sensor component 514 includes one or more sensors to provide status assessments of various aspects of the electronic device 500. For instance, the sensor component 514 may detect an open/closed status of the electronic device 500, relative positioning of components, e.g., the display and the keypad, of the electronic device 500, a change in position of the electronic device 500 or a component of the electronic device 500, a presence or absence of user contact with the electronic device 500, an orientation or an acceleration/deceleration of the electronic device 500, and a change in temperature of the electronic device 500. In some embodiments, the sensor component 514 may also include a magnetic sensor, a gyroscope sensor, and a magnetic field sensor including at least one of the following: a Hall sensor, a thin film magnetoresistive sensor, and a magnetic liquid acceleration sensor.

The communication component 516 is configured to facilitate communication, wired or wirelessly, between the electronic device 500 and other devices. The electronic device 500 can access a wireless network based on a communication standard, such as WiFi, 2G 3G 4G 5G or a combination thereof. In one exemplary embodiment, the communication component 516 receives a broadcast signal or broadcast associated information from an external broadcast management system via a broadcast channel. In one exemplary embodiment, the communication component 516 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the electronic device 500 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components.

In exemplary embodiments, there is also provided a non-transitory computer-readable storage medium including an executable computer program, such as the memory 504 including instructions. For example, the non-transitory computer-readable storage medium may be a ROM, a RAM, a CD-ROM, a magnetic tape, a floppy disc, an optical data storage device, and the like.

Other embodiments of the present disclosure will be apparent to those skilled in the art from consideration of the specification and practice of the present disclosure disclosed here. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure only be limited by the appended claims.

What is claimed is:

1. An electronic device, comprising a base and a flip, wherein the flip is rotatable around a rotation axis to make the electronic device in a closed state, wherein the base is provided with a first antenna comprising a first slot, and the flip is provided with a second antenna comprising a groove;
   wherein in the closed state, the first slot in the first antenna is opposite to the groove in the second antenna;
   wherein the base comprises a main housing, a first L-shaped radiating section, a T-shaped radiating section, a second L-shaped radiating section, a first feeding point and a second feeding point; the first L-shaped radiating section, the T-shaped radiating section and the second L-shaped radiating section are respectively connected to the main housing; wherein
   the first feeding point is disposed at a first end of the first L-shaped radiating section, the second feeding point is disposed at a first end of a lateral radiating section of the T-shaped radiating section, and the first end of the first L-shaped radiating section provided with the first feeding point is opposite to the first end of the lateral radiating section provided with the second feeding point;
   the first L-shaped radiating section, the T-shaped radiating section and the main housing together define a first L-shaped slot; and the first L-shaped radiating section, the main housing, the T-shaped radiating section, the first feeding point, and the second feeding point form the first antenna.

2. The electronic device according to claim 1, wherein the base is further provided with a third antenna, and the flip is further provided with a fourth antenna;
   wherein in the closed state, the third antenna is opposite to the fourth antenna.

3. The electronic device according to claim 2, wherein
   the first antenna is a GPS&WiFi antenna having a working frequency band of L1/L5/WiFi 2.4G/WiFi 5G;
   the second antenna is a low-frequency antenna having a working frequency band of B5/B8/B20/B28;
   the third antenna is a high-frequency antenna having a working frequency band of N78/79 or LTE B1/B3/B7; and
   the fourth antenna is a medium-high-frequency antenna having a working frequency band of B32/N41.

4. The electronic device according to claim 2, wherein the fourth antenna comprises a first matching circuit configured to eliminate a current signal coupled from at least one of the first antenna and the third antenna in the closed state, and an input end of the first matching circuit is connected to a body of the fourth antenna and an output end of the first matching circuit is grounded.

5. The electronic device according to claim 4, wherein the first matching circuit comprises an LC filter circuit.

6. The electronic device according to claim 5, wherein the LC filter circuit comprises an inductor having an inductance of 24 to 30 nH and a capacitor having a capacitance of 0.2 to 0.3 PF.

7. The electronic device according to claim 4, wherein the second antenna comprises a second matching circuit configured to eliminate a current signal coupled from at least one of the first antenna and the third antenna in the closed state, and an input end of the second matching circuit is connected to a body of the second antenna and an output end of the second matching circuit is grounded.

8. The electronic device according to claim 7, wherein the second matching circuit comprises a switch, a plurality of matching branches and a ground terminal;
an input end of the switch is connected to the body of the second antenna, each output end of the switch is connected to a first end of each of the plurality of the matching branches; a second end of each of the plurality of the matching branches is connected to the ground terminal.

9. The electronic device according to claim 8, wherein the plurality of the matching branches comprise a capacitor branch having a preset capacitor with a capacitance greater than a preset capacitance.

10. The electronic device according to claim 9, wherein the switch has a fully open state where all of the plurality of the matching branches are connected to the body of the second antenna, and an equivalent capacitance of the plurality of the matching branches is greater than the preset capacitance.

11. The electronic device according to claim 8, wherein one of the plurality of matching branches is configured to optimize at least one of the first antenna and the third antenna, and the rest of the plurality of matching branches are configured to adjust a working frequency band of the second antenna.

12. The electronic device according to claim 8, wherein the switch is selected from a single-pole multi-throw switch, a relay, a transistor and a switch circuit with multiple outputs.

13. The electronic device according to claim 8, wherein the plurality of the matching branches comprises at least one selected from a resistor branch, an inductor branch, a capacitor branch, and an impedance circuit formed by at least two of a resistor, an inductor, and a capacitor.

14. The electronic device according to claim 1, wherein the base further comprises the second L-shaped radiating section connected to the main housing; wherein
the second L-shaped radiating section is opposite to a second end of the lateral radiating section away from the second feeding point; the second L-shaped radiating section, the T-shaped radiating section and the main housing together define a strip-shaped slot; and the second L-shaped radiating section, the T-shaped radiating section and the main housing form a third antenna.

15. The electronic device according to claim 1, wherein the second L-shaped radiating section is opposite to a second end of the lateral radiating section away from the second feeding point; the second L-shaped radiating section, the T-shaped radiating section and the main housing together define a strip-shaped slot; and the second L-shaped radiating section, the T-shaped radiating section and the main housing form the third antenna.

16. The electronic device according to claim 1, wherein the flip comprises a secondary housing, a third L-shaped radiating section, a fourth L-shaped radiating section, a third feeding point and a fourth feeding point; the third L-shaped radiating section and the fourth L-shaped radiating section are respectively connected to the secondary housing; the fourth L-shaped radiating section has the groove; wherein
the third feeding point is disposed on the third L-shaped radiating section, and the fourth feeding point is disposed on the fourth L-shaped radiating section; the third L-shaped radiating section and the fourth L-shaped radiating section are opposite to define a second slot, and the fourth feeding point is arranged between the second slot and the groove;
the third L-shaped radiating section, the fourth L-shaped radiating section and the secondary housing together define a second L-shaped slot; a lateral part of the second L-shaped slot is far away from the third L-shaped radiating section; the third L-shaped radiating section, the third feeding point and the secondary housing form a fourth antenna, and the fourth L-shaped radiating section, the fourth feeding point and the secondary housing form the second antenna.

17. The electronic device according to claim 1, wherein the flip comprises a secondary housing, a third L-shaped radiating section, a fourth L-shaped radiating section, a third feeding point and a fourth feeding point; the third L-shaped radiating section and the fourth L-shaped radiating section are respectively connected to the secondary housing; the fourth L-shaped radiating section has the groove; wherein
the third feeding point is disposed on the third L-shaped radiating section, and the fourth feeding point is disposed on the fourth L-shaped radiating section; the third L-shaped radiating section and the fourth L-shaped radiating section are opposite to define a second slot, and the fourth feeding point is arranged between the second slot and the groove;
the third L-shaped radiating section, the fourth L-shaped radiating section and the secondary housing together define a second L-shaped slot; a lateral part of the second L-shaped slot is far away from the third L-shaped radiating section; the third L-shaped radiating section, the third feeding point and the secondary housing form the fourth antenna, and the fourth L-shaped radiating section, the fourth feeding point and the secondary housing form the second antenna.

18. The electronic device according to claim 1, wherein a width of the groove is equal to a width of the first slot in the first antenna; and a depth of the groove is smaller than a depth of the first slot in the first antenna; a width direction of the groove is parallel to an extension direction of a frame where the first antenna and the second antenna are located, and a depth direction of the groove is perpendicular to the extension direction of the frame where the first antenna and the second antenna are located.

* * * * *